(12) United States Patent
Stuart et al.

(10) Patent No.: US 9,374,988 B2
(45) Date of Patent: Jun. 28, 2016

(54) DEVICE FOR TIMED RELEASE OF BAIT

(75) Inventors: Vincent Joseph Stuart, Meteghan Centre (CA); Matthew Ivan D'Entremont, Lakeview (CA)

(73) Assignee: CLARE MACHINE WORKS LTD., Nova Scotia (CA)

( * ) Notice: Subject to any disclaimer, the term of this patent is extended or adjusted under 35 U.S.C. 154(b) by 636 days.

(21) Appl. No.: 13/092,656

(22) Filed: Apr. 22, 2011

(65) Prior Publication Data

US 2012/0260561 A1 Oct. 18, 2012

(30) Foreign Application Priority Data

Apr. 14, 2011 (CA) ........................................ 2737320

(51) Int. Cl.
*A01K 97/02* (2006.01)
*A01K 69/00* (2006.01)

(52) U.S. Cl.
CPC .................. *A01K 69/00* (2013.01); *A01K 97/02* (2013.01)

(58) Field of Classification Search
CPC ....................................................... A01K 97/02
USPC .............................................. 43/44.99, 43.12
See application file for complete search history.

(56) References Cited

U.S. PATENT DOCUMENTS

| | | | | | |
|---|---|---|---|---|---|
| 1,530,027 | A | * | 3/1925 | Barlow | A01K 95/00 43/43.12 |
| 2,329,117 | A | * | 9/1943 | Henderson et al. | 43/43.12 |
| 2,754,614 | A | * | 7/1956 | Yakel | A01K 95/00 43/43.12 |
| 3,022,599 | A | * | 2/1962 | Lawley | 43/44.99 |
| 3,281,983 | A | * | 11/1966 | Blankenbecler | A01K 91/02 43/43.12 |
| 3,405,476 | A | * | 10/1968 | Pumilio | A01K 95/00 43/42.09 |
| 3,415,005 | A | * | 12/1968 | Gilham | A01K 95/005 43/43.12 |
| 3,426,472 | A | * | 2/1969 | Richard | 43/100 |
| 3,654,725 | A | * | 4/1972 | Kingston | 43/44.99 |
| 3,685,196 | A | * | 8/1972 | Scott | A01K 97/02 43/43.12 |
| 3,724,120 | A | * | 4/1973 | Richard | 43/43.12 |
| 3,769,740 | A | * | 11/1973 | Lang | 43/44.99 |
| 3,834,059 | A | * | 9/1974 | Overstreet | A01K 95/005 43/43.12 |
| 3,842,529 | A | * | 10/1974 | Richard | 43/44.99 |
| 3,992,804 | A | * | 11/1976 | Senese | 43/100 |
| 4,286,403 | A | * | 9/1981 | Rogers | A01K 95/00 43/43.12 |
| 4,445,295 | A | * | 5/1984 | Litrico | 43/102 |
| 5,894,694 | A | * | 4/1999 | Erlandson | 43/100 |
| 5,913,672 | A | * | 6/1999 | Nicholson | 43/44.99 |
| 6,453,602 | B1 | * | 9/2002 | Russell et al. | 43/44.99 |
| 6,848,210 | B1 | * | 2/2005 | Altman et al. | 43/44.99 |

(Continued)

FOREIGN PATENT DOCUMENTS

| CA | 2428838 C | * | 8/2005 | ............ A01K 69/00 |
|---|---|---|---|---|
| EP | 951827 A1 | * | 10/1999 | ............ A01K 97/02 |

(Continued)

*Primary Examiner* — Darren W Ark
(74) *Attorney, Agent, or Firm* — Thompson Hine LLP

(57) ABSTRACT

A device for timed release of a bait. The device comprises an enclosure with a release portion of the enclosure being movable between a closed position for enclosing the bait therein and an open position for exposing the bait. An actuating mechanism is connected to the enclosure for moving the release portion of the enclosure from the closed position to the open position. A timing mechanism is connected to at least one of the enclosure and the actuating mechanism. The timing mechanism triggers the movement of the release portion of the enclosure from the closed position to the open position after elapse of a predetermined time interval.

11 Claims, 13 Drawing Sheets

(56) References Cited

U.S. PATENT DOCUMENTS

| | | | | |
|---|---|---|---|---|
| 6,880,290 | B2* | 4/2005 | Mahoney | 43/17.2 |
| 7,305,791 | B2* | 12/2007 | Patton | 43/44.99 |
| 7,392,613 | B2* | 7/2008 | Boozer et al. | 43/44.99 |
| 8,261,484 | B2* | 9/2012 | Bono | A01K 95/00 43/43.12 |
| 9,155,291 | B1* | 10/2015 | Russ | A01K 97/02 |
| 2011/0041381 | A1* | 2/2011 | Houghton | 43/44.99 |
| 2012/0317867 | A1* | 12/2012 | Houghton | 43/44.99 |
| 2013/0247447 | A1* | 9/2013 | Bono | 43/43.12 |
| 2014/0190066 | A1* | 7/2014 | Bono | 43/43.12 |

FOREIGN PATENT DOCUMENTS

| | | | | | |
|---|---|---|---|---|---|
| GB | 2246275 | A | * | 1/1992 | A01K 95/00 |
| GB | 2250167 | A | * | 6/1992 | A01K 97/02 |
| GB | 2255485 | A | * | 11/1992 | A01K 97/02 |
| GB | 2405070 | A | * | 2/2005 | A01K 91/06 |
| GB | 2411205 | A | * | 8/2005 | A01K 97/02 |
| GB | 2421164 | A | * | 6/2006 | A01K 83/06 |
| GB | 2692231 | A1 | * | 2/2014 | A01K 97/02 |
| JP | 11341940 | A | * | 12/1999 | A01K 97/02 |
| JP | WO 2005084433 | A1 | * | 9/2005 | A01K 97/02 |
| JP | 2012157247 | A | * | 8/2012 | A01K 97/02 |
| JP | 2013031396 | A | * | 2/2013 | A01K 97/02 |
| WO | WO 2004100655 | A1 | * | 11/2004 | A01K 97/02 |

* cited by examiner

DEVICE FOR TIMED RELEASE OF BAIT

This application claims priority to Canadian Patent Application No. 2,737,320, filed on Apr. 14, 2011, entitled DEVICE FOR TIMED RELEASE OF BAIT, by inventors Vincent Joseph Stuart and Matthew Ivan D'Entremont, in the name of Clare Machine Works Ltd., the entire contents of which are hereby incorporated by reference.

FIELD

The present invention relates to the field of traps for trapping marine animals, and more particularly to a device for timed release of bait.

BACKGROUND

In order to catch marine animals and in particular crustacean such as, for example, lobsters and crabs, a trap is employed which is placed on the ocean floor and which contains a bait to entice the crustacean into the trap. The bait is usually in the form of a piece of fish openly placed inside a chamber that is accessible through one or more designated gates which enable the crustacean to enter the chamber but substantially prevent them from leaving the same. The traps are left on the ocean floor for an extended period of time—typically several days—to attract a sufficient number of crustaceans.

Unfortunately, ocean currents wash the bait, and attacks of sand fleas, sline eels, the crustacean as well as other marine animals such as fish make it difficult retaining the bait for an extended period of time while at the same time making it sufficiently accessible and exposed to attract the crustaceans.

Consequently, the traps need to be checked and re-baited in regular time intervals resulting in additional work and time spent at sea for the fishermen, with corresponding risks to the welfare of the fishermen and equipment, as well as in additional cost for fuel with corresponding increase in pollutants and emissions associated with the burning of fuel during the rebaiting process.

It is desirable to provide a device that reduces the frequency of re-baiting the trap and extends the fishing time of the trap.

It is also desirable to provide a device that retains the bait in a protecting enclosure for a predetermined period of time.

It is also desirable to provide a device that releases or exposes the bait after the elapse of a predetermined period of time.

SUMMARY

Accordingly, one object of the present invention is to provide a device that reduces the frequency of re-baiting the traps and extends the fishing time of the trap.

Another object of the present invention is to provide a device that retains the bait in a protecting enclosure for a predetermined period of time.

Another object of the present invention is to provide a device that releases or exposes the bait after the elapse of a predetermined period of time.

According to one aspect of the present invention, there is provided a device for timed release or exposure of a bait. The device comprises an enclosure with a release portion of the enclosure being movable between a closed position for enclosing the bait therein and an open position for exposing the bait. An actuating mechanism is connected to the enclosure for moving the release portion of the enclosure from the closed position to the open position. A timing mechanism is connected to at least one of the enclosure and the actuating mechanism. The timing mechanism triggers the movement of the release portion of the enclosure from the closed position to the open position after elapse of a predetermined time interval.

According to another aspect of the present invention, there is further provided a timing element. The timing element comprises a timing element body made of a water soluble material. The timing element body has a predetermined size and shape such that in operation a predetermined portion of the timing element body is accommodated in a respective holding structure disposed in a first device element and such that a predetermined surface portion of the timing element is in contact with a respective surface portion of a second device element for preventing relative movement between the first device element and the second device element. The size and shape of the timing element body is determined such that the timing element body withstands a predetermined force acting thereupon for a predetermined time interval when immersed in water.

According to another aspect of the present invention, there is further provided a method for timing release of a bait. An enclosure is provided with a release portion of the enclosure being movable between a closed position for enclosing the bait therein and an open position for releasing the bait. An actuating mechanism connected to the enclosure is provided for moving the release portion of the enclosure from the closed position to the open position. The bait is placed inside the enclosure and the release portion of the enclosure is moved to the closed position. A timing element made of a water soluble material is placed in a predetermined location such that the timing element abuts the release portion of the enclosure in the closed position. The timing element triggers the movement of the release portion of the enclosure from the closed position to the open position after elapse of a predetermined time interval.

One advantage of the present invention is that reduces the frequency of re-baiting the trap and extends the fishing time of the trap.

A further advantage of the present invention is that it provides a device that retains the bait in a protecting enclosure for a predetermined period of time.

A further advantage of the present invention is that it provides a device that releases the bait after the elapse of a predetermined period of time.

BRIEF DESCRIPTION OF THE DRAWINGS

One embodiment of the present invention is described below with reference to the accompanying drawings, in which.

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, certain methods and materials are now described.

While embodiments of the invention will be described for use with lobster traps, it will become evident to those skilled in the art that the embodiments of the invention are not limited thereto, but are applicable for use with traps for trapping various species of marine and fresh water animals.

Figure 1:
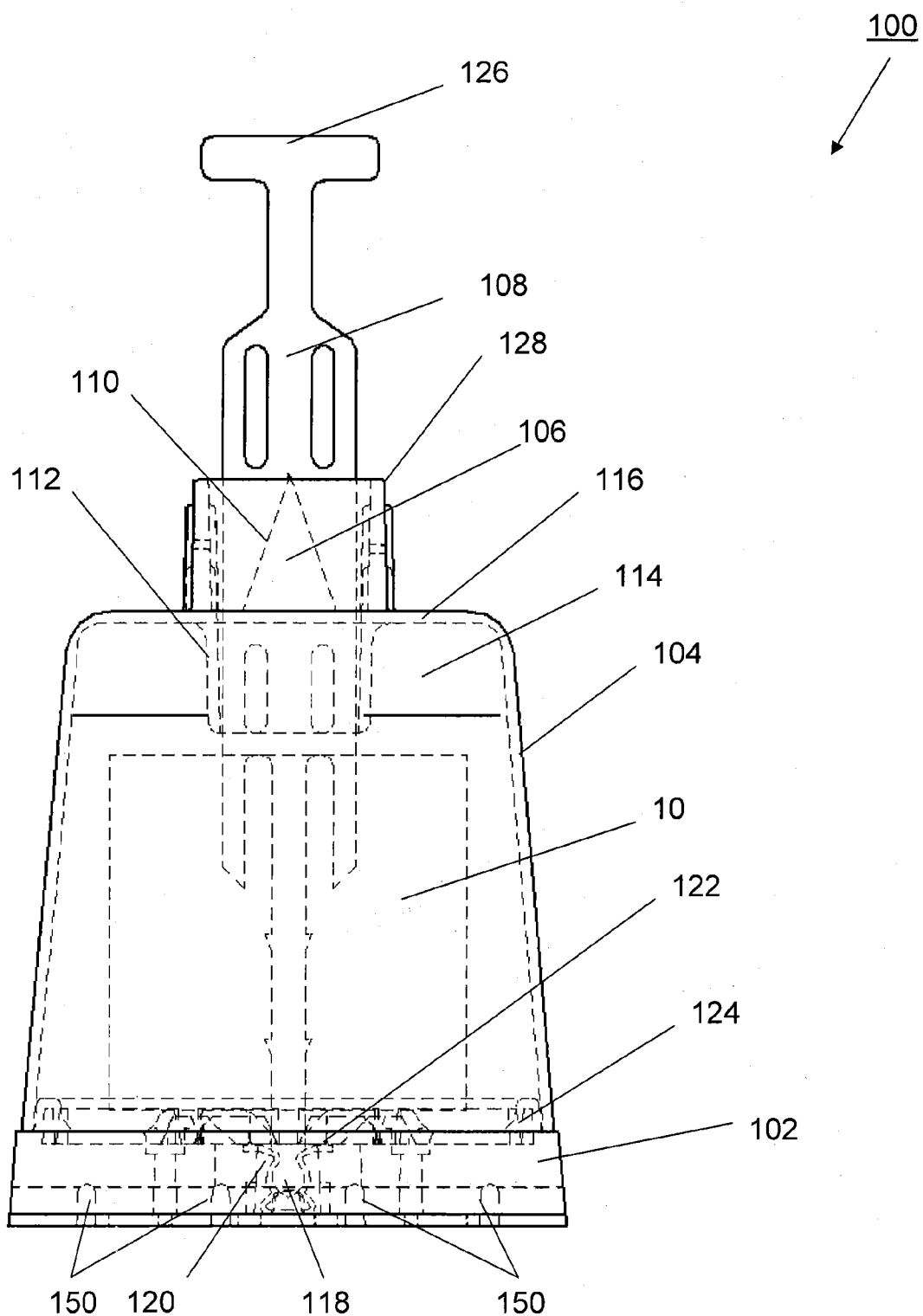
FIGS. 1 and 2 are simplified block diagrams illustrating a cross sectional and a perspective view, respectively, of a device for timed release of a bait in a closed position according to one embodiment of the invention.
Figure 2:
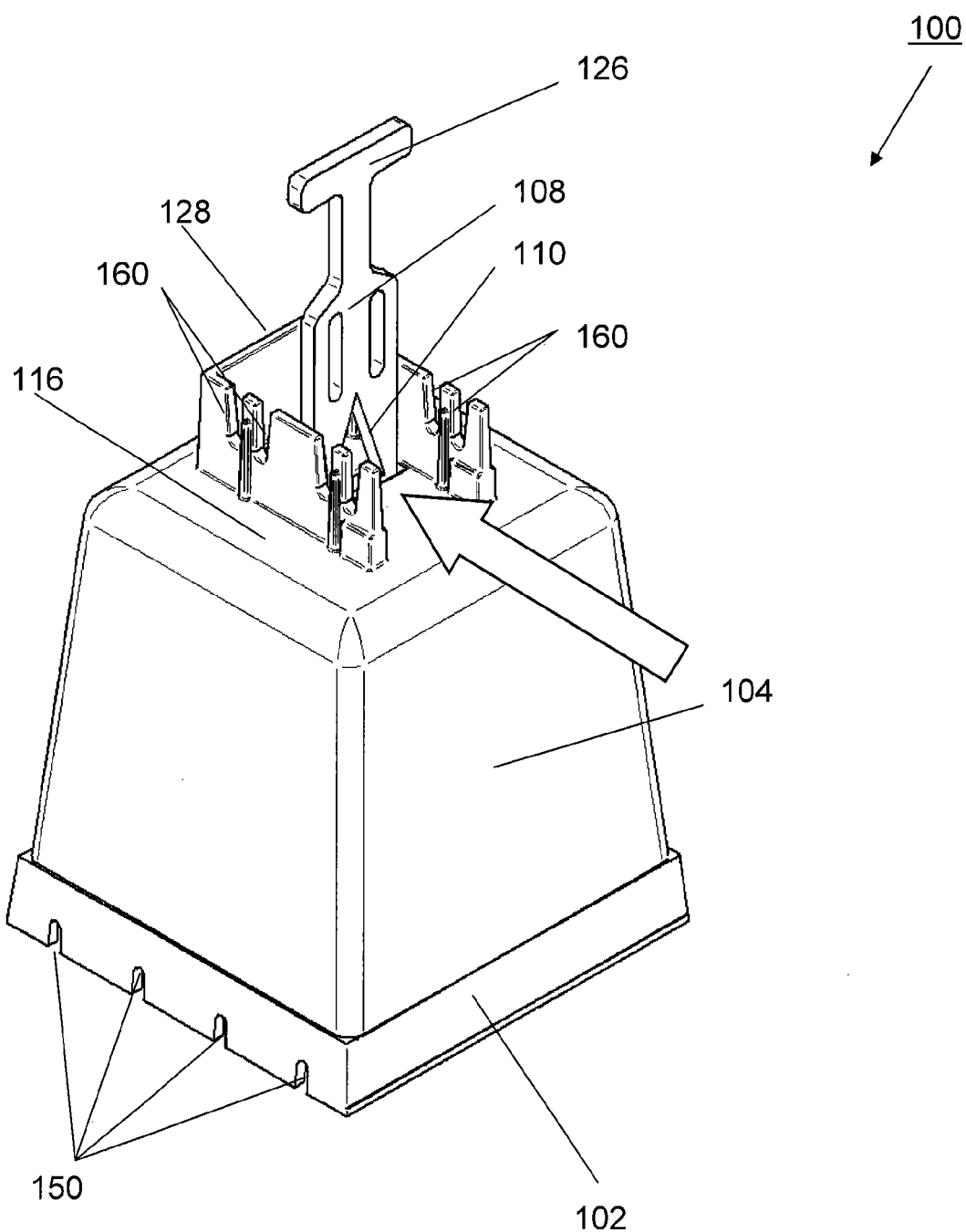
Figure 3:
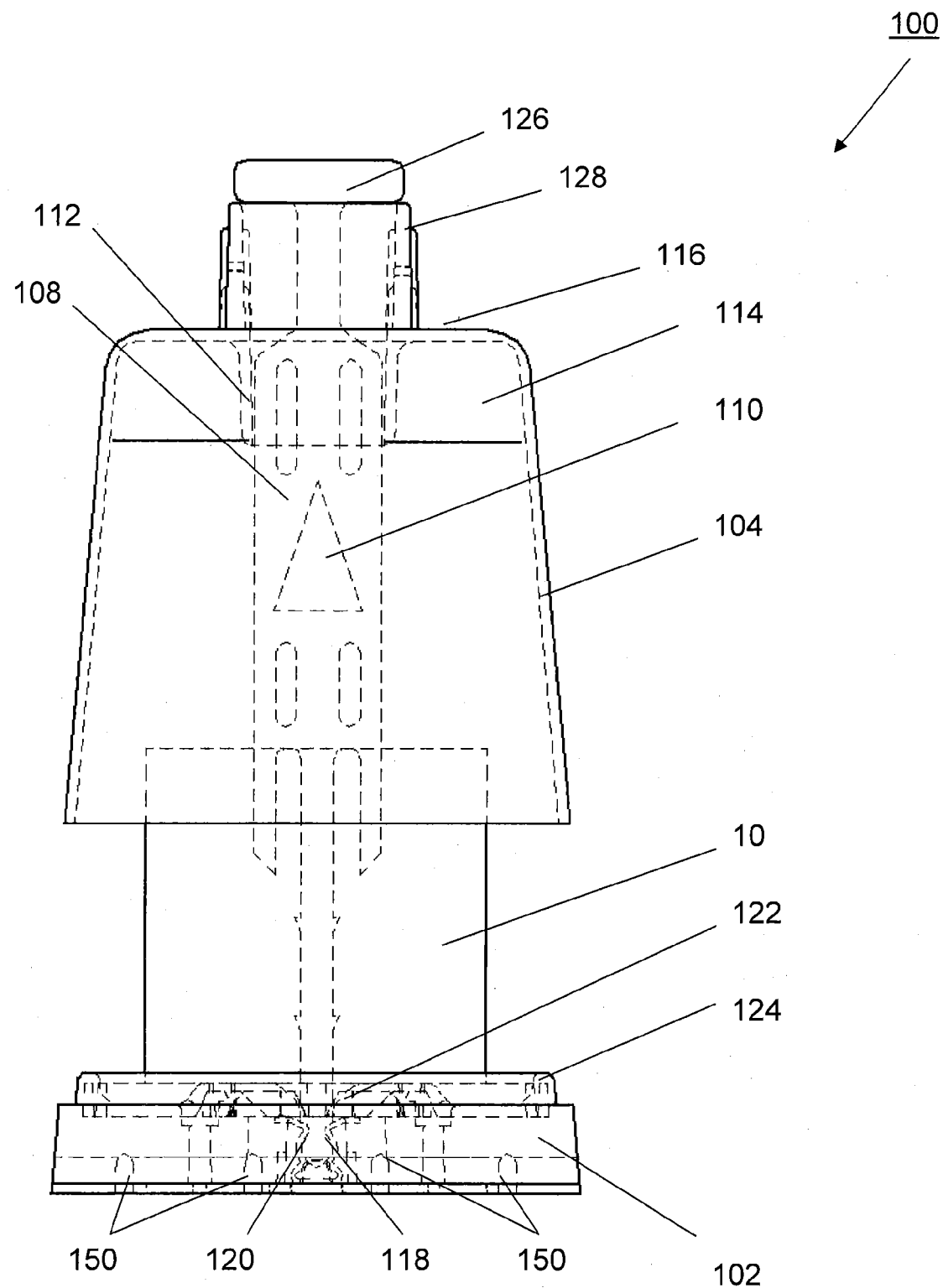
FIGS. 3 and 4 are simplified block diagrams illustrating a cross sectional and a perspective view, respectively, of the device for timed release of a bait in an open position according to an embodiment of the invention.
Figure 4:
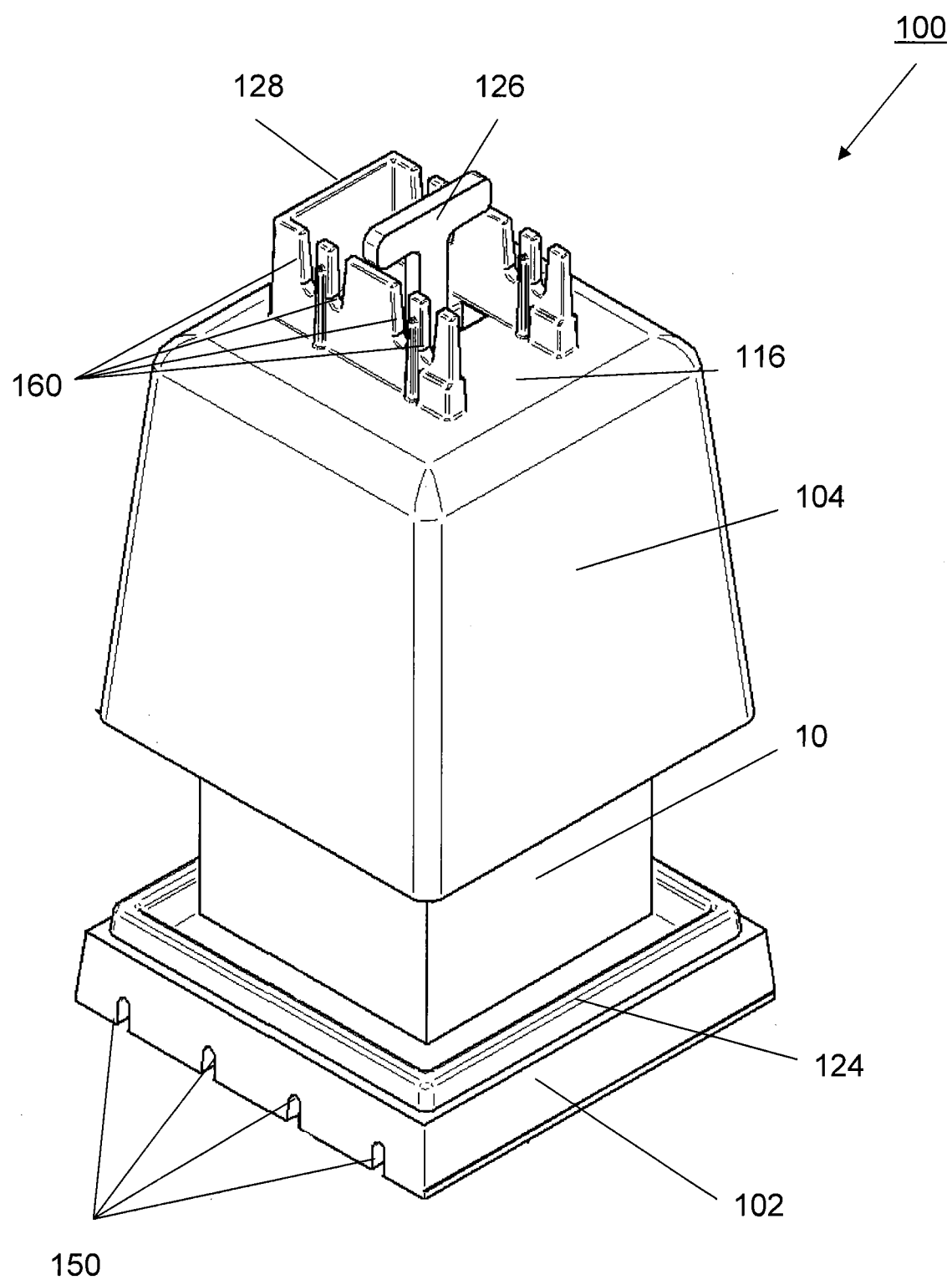

Referring to FIGS. 1 to 9b, a device 100 for timed release of a bait according to one embodiment of the invention is provided. The device 100 comprises a base 102 and a cover 104 forming an enclosure for retaining the bait 10 therein in a substantially protected fashion when in a closed position, as illustrated in FIGS. 1 and 2. For providing movement between the cover 104 and the base 102 for opening the enclosure and releasing the bait 10 an actuating mechanism is provided. The actuating mechanism may comprise a buoyancy element 114 disposed in the upper portion of the cover 104. When released the buoyancy element 114 provides a force acting on the cover 104, thus moving the same upward in a substantially vertical direction for moving the enclosure into an open position, as illustrated in FIGS. 3 and 4.

Figure 5:
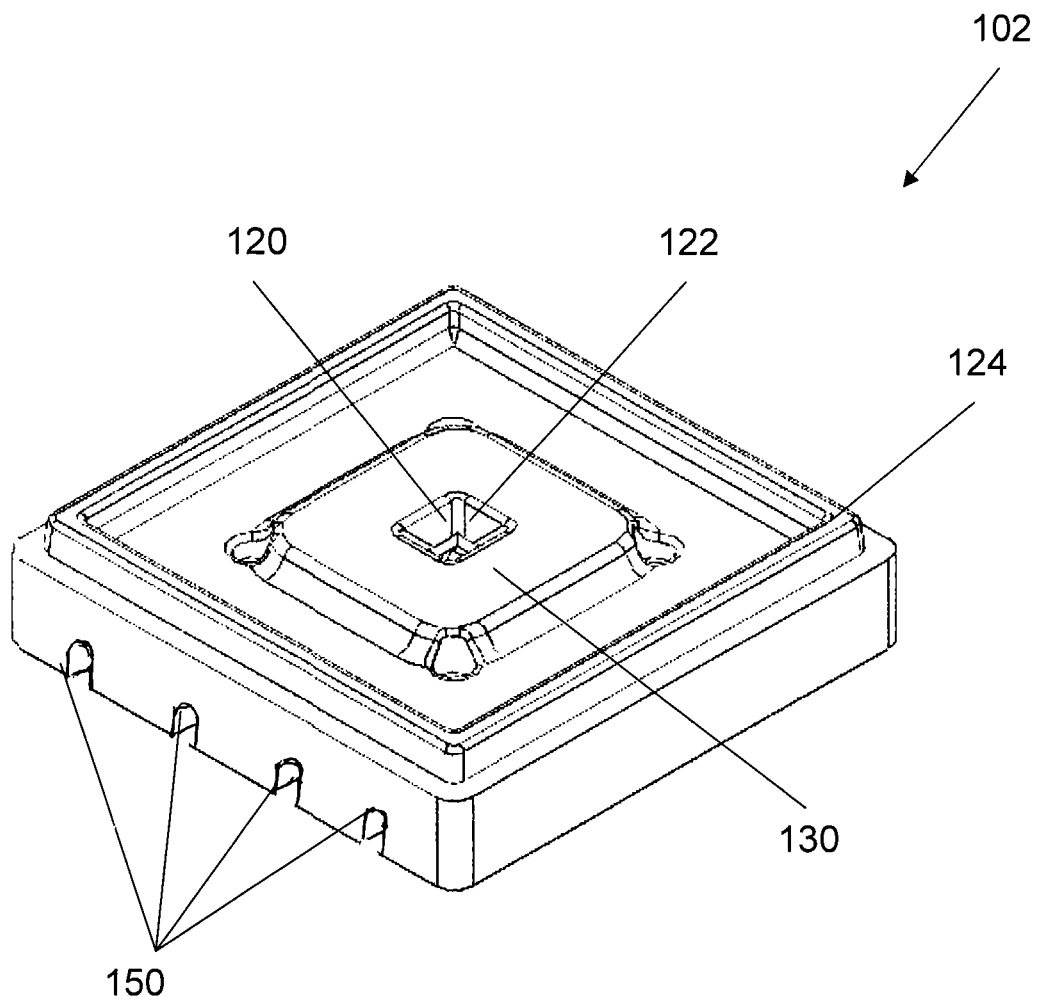
FIG. 5 is a simplified block diagram illustrating a perspective view of a base of the device for timed release of a bait according to an embodiment of the invention.

Guiding element 108 interacting with a respective guiding channel 112 disposed in the upper portion of the cover 104 enables guided relative movement between the cover 104 and the base 102 along a substantially vertical direction. The guiding element 108 can be removable mounted to the base using a quick fastening mechanism comprising, for example, an interacting element 118—having the form of, for example, an ace of spades—disposed at the tip of the guiding element 108 interacting with a spring clip 120 disposed in cavity 122 which is, in one case, placed in proximity to the center of the base 102. To facilitate insertion of the guiding element 108 into the spring clip 120, the cavity 122 is provided with sloped walls for directing the interacting element 118 of the guiding element 108 towards the spring clip 120. The base 102 further comprises surface 130 for placing the bait thereupon and ridge 124 for abutting a bottom portion of the cover 104 in the closed position, as illustrated in FIG. 5.

Timing element 106 triggers the movement of the cover 104 from the closed position to the open position after elapse of a predetermined time interval. The timing element 106 can be made of a water soluble material as will be described in more detail herein below. A predetermined portion of the timing element 106 is accommodated in aperture 110 of the guiding element 108 such that the timing element abuts upper surface 116 of the cover 104 in the closed position. The timing element 106 can be disposed in a protective housing 128—comprising, for example, a U-shaped wall structure forming part of the cover 104—to protect the timing element 106 from ocean currents and attacks by marine animals. After the timing element 106 is substantially dissolved—after elapse of the predetermined time interval—the upwardly directed force provided by the buoyancy element 114 moves the cover 104 from the closed position to the open position until the cover 104 is abutted through interaction of an upper surface portion of the protective housing 128 with handle 126 of the guiding element 108, as illustrated in FIGS. 3 and 4.

Figure 7A:
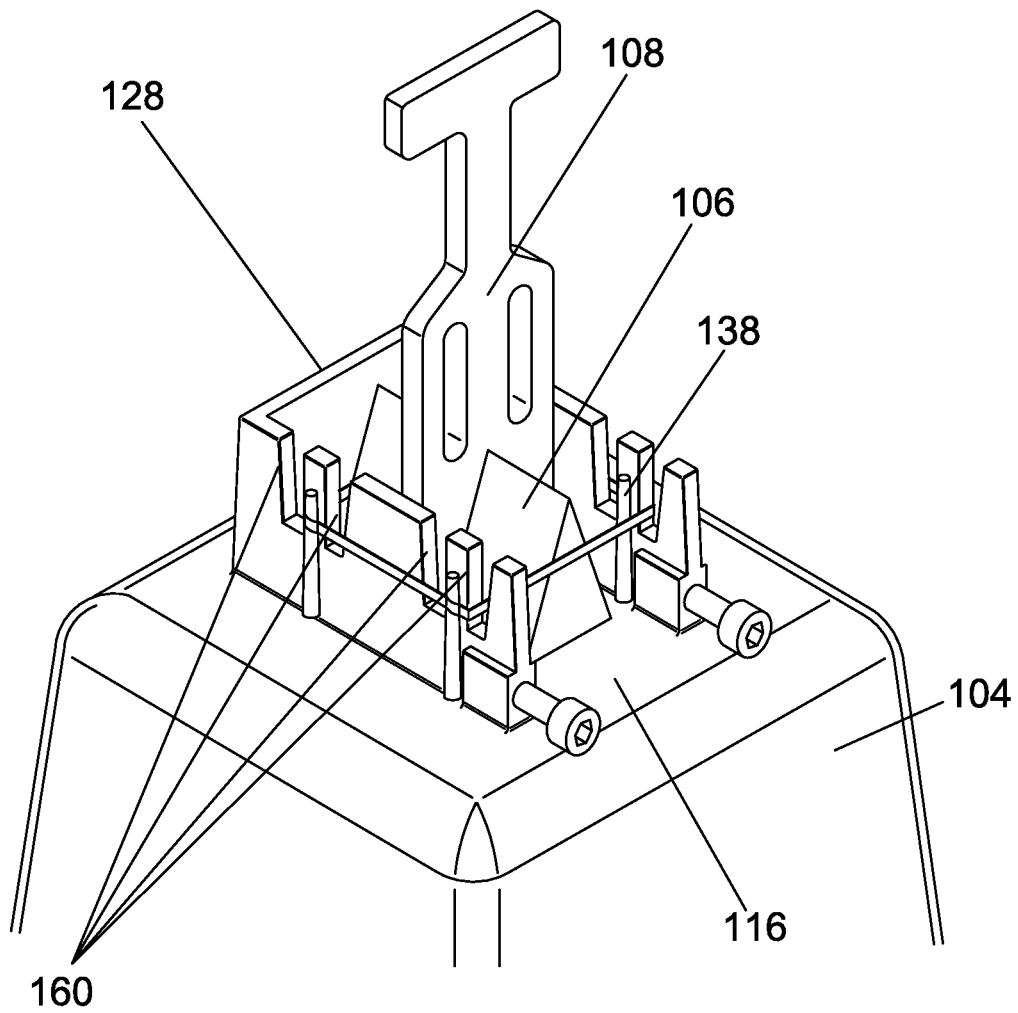
FIGS. 7a and 7b are simplified block diagrams illustrating a perspective view of the top of the device for timed release of a bait according to an embodiment of the invention.
Figure 7B:
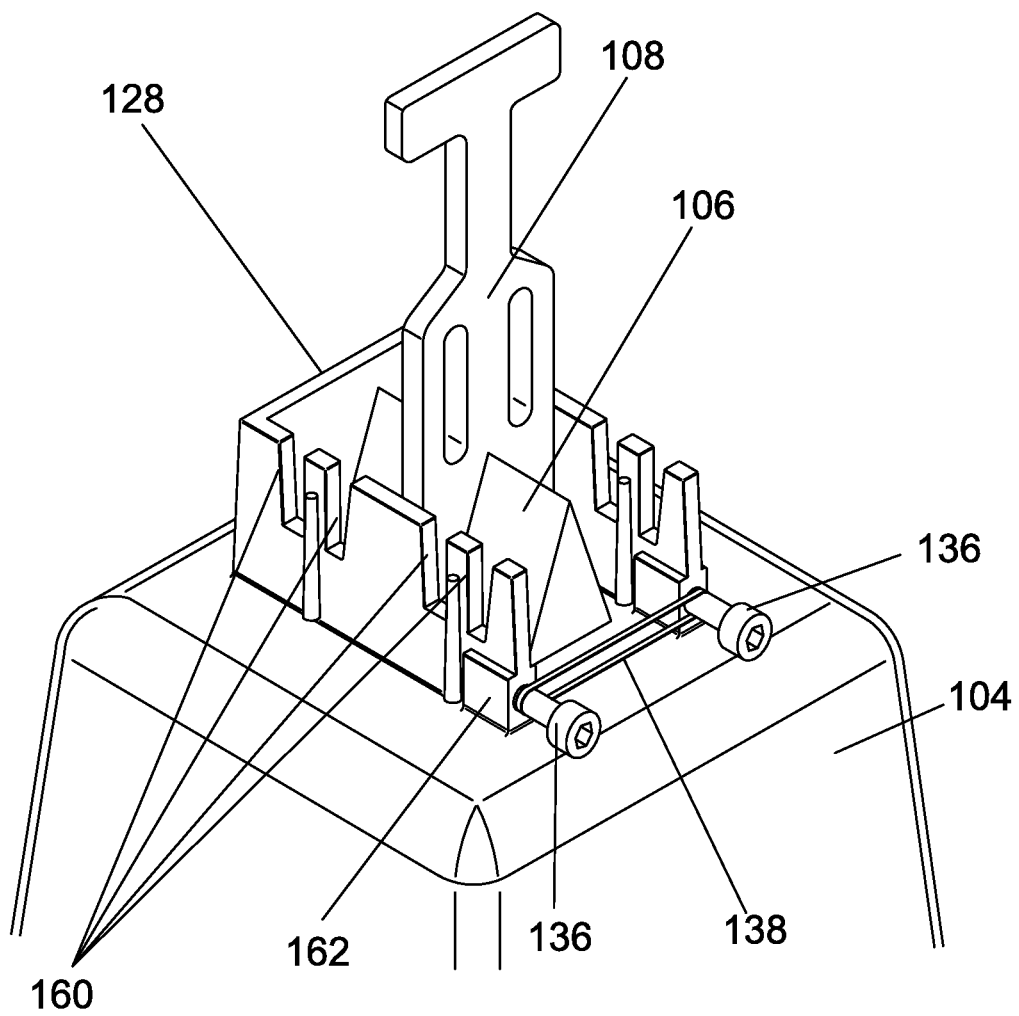

Prior deployment, the bait 10 is placed onto the surface 130 of the base 120. The guiding element 108 is inserted into the guiding channel 112 of the cover 104 and then pushed through the bait 10 and inserted into the spring clip 120. The cover 104 is then moved into the closed position, and the timing element 106 is inserted into the protective housing 128 and a portion thereof through the aperture 110 of the guiding element 108, as illustrated by the block arrow in FIG. 2. In one case the protective housing 128 comprises a plurality of cut-outs 160 for securing the timing element 106 using elastic band 138 until the device 100 is submerged in water, as illustrated in FIG. 7a. When submerged in water, buoyancy acting on the cover 104 abuts the timing element 106 against the aperture 110 of the guiding element 108, thus securing the timing element 106. The cut-outs 160 are placed such that securing of timing elements 106 having different predetermined lengths L is enabled by using the elastic band 138 and different combinations of the cut-outs 160. Optionally, protrusions 136 are provided for placing the elastic band 138 there around, as illustrated in FIG. 7b, to secure the timing element 106 having, for example, the length of the housing 128. For example, end portions 162 of the housing 128 are widened for accommodating the protrusions 136 in the form of screws therein.

Figure 6:
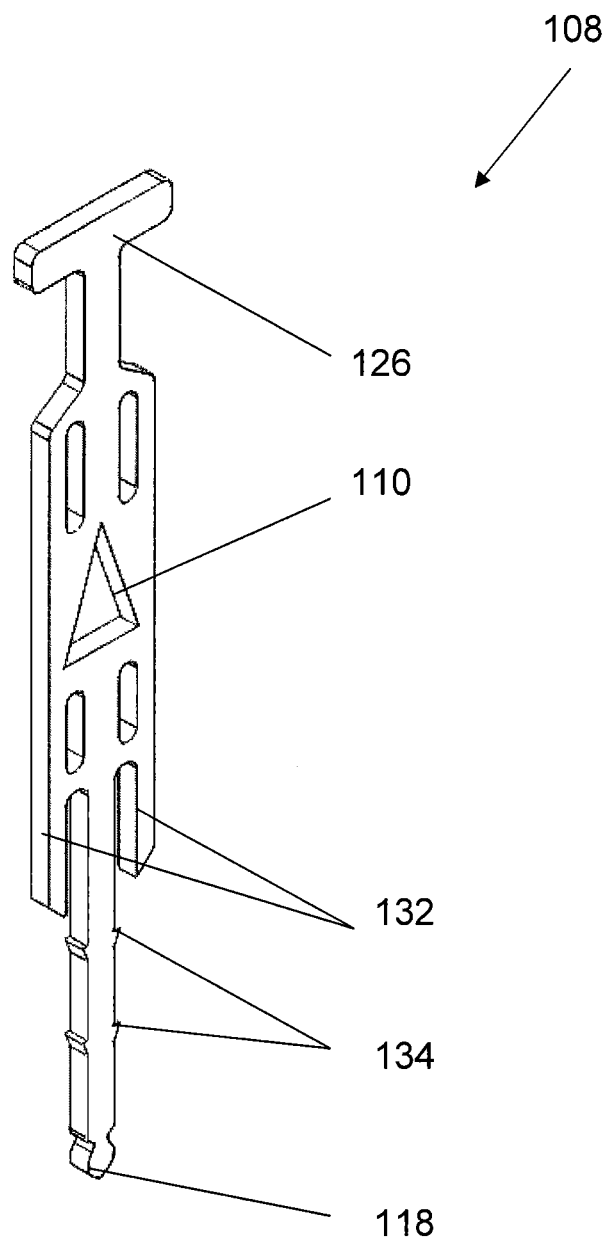
FIG. 6 is a simplified block diagram illustrating a perspective view of a guiding element of the device for timed release of a bait according to an embodiment of the invention.

The guiding element 108 further may comprise stabilizer forks 132 and optionally may have bait barbs 134 for securing the bait when the enclosure is in the open position, as illustrated in FIG. 6.

Further, the ridge 124 and the respective bottom portion of the cover 104 as well as the guiding member 108 and the respective guiding channel 112 may be designed such that in the closed position a seal is provided to the extend that small marine animals such as, for example, fleas are prevented from entering the enclosure while fluid communication between the inside and the outside of the enclosure is enabled to ensure pressure equalization when the device 100 is immersed in water.

The base 102 and the cover 104 each are made of, for example, a suitable plastic material such as a UV resistant plastic type material and are manufactured, for example, as single units using a standard plastic molding process. The spring clip is mounted to the base 102 using a standard screw mechanism or is incorporated into the base 102 during the plastic molding process. The guiding element 108 is made of a suitable metal such as, for example, stainless steel or, alternatively, of a suitable plastic material such as a UV resistant plastic. The buoyancy element 114 is made of, for example, a suitable closed cell syntactic foam.

Alternatively, the buoyancy element is replaced using, for example, a spring mechanism for actuating the cover. Further alternatively, the cover is pivotally movable mounted to the base with the timing element abutting a surface portion of the cover opposite to the pivot.

Alternatively, the timing mechanism comprises an electrical timer such as, for example, a digital counter or a mechanical timer such as, for example, a wind-up timing device.

Figure 8:
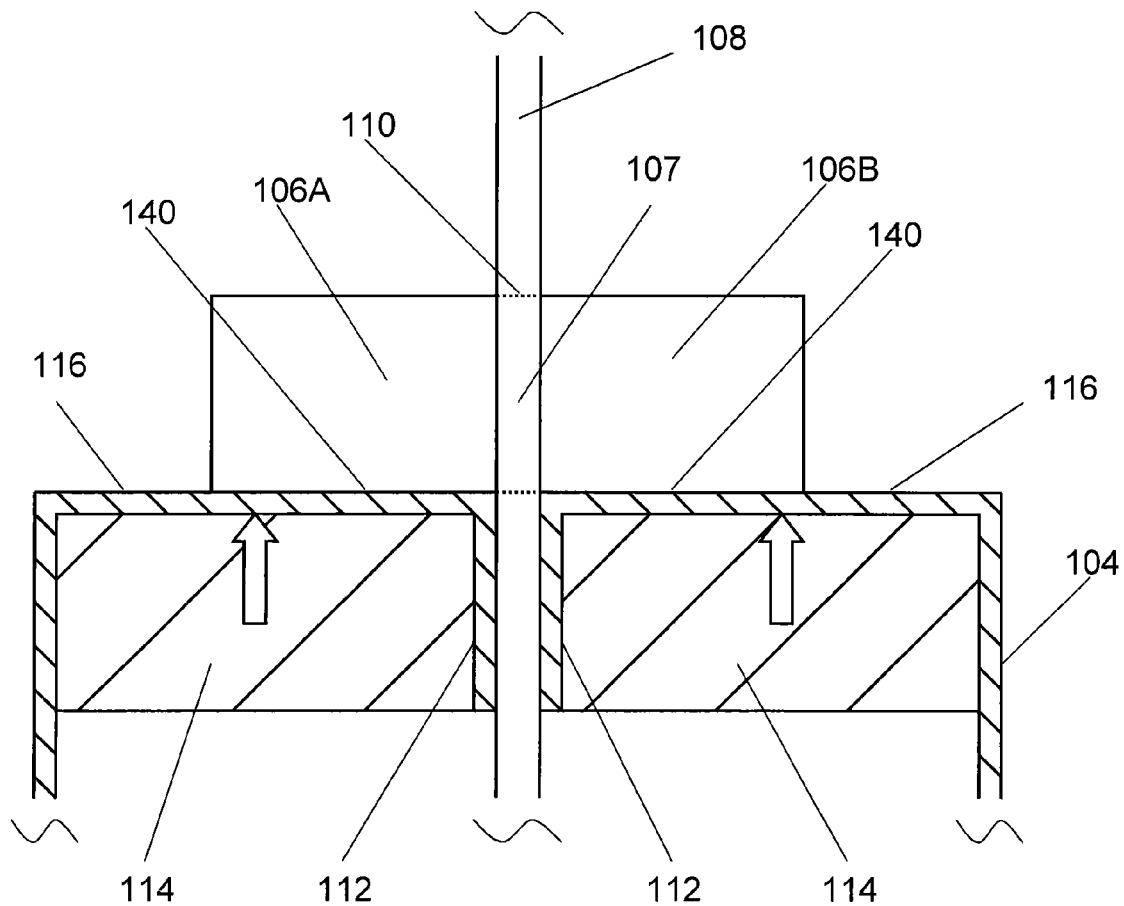
FIG. 8 is a simplified block diagram illustrating a cross-sectional view of the top of the device for timed release of a bait according to an embodiment of the invention.
Figure 9A:
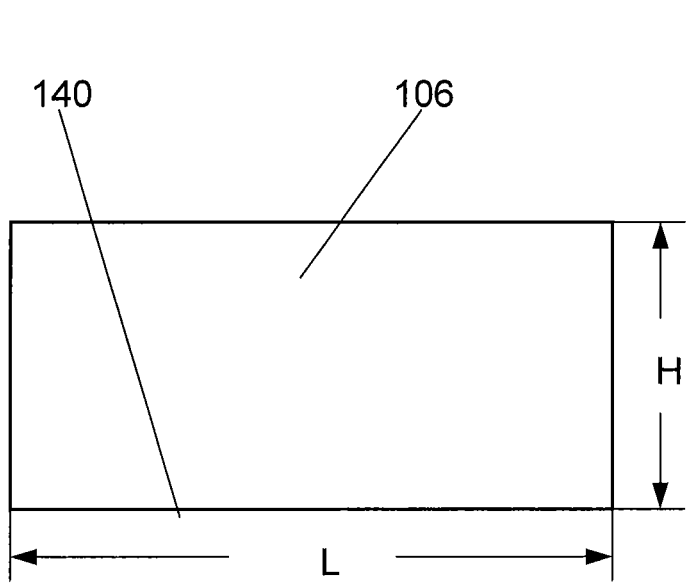
FIGS. 9a to 9c are simplified block diagrams illustrating a side view and front views of a timing element of the device for timed release of a bait according to an embodiment of the invention; and, FIGS. 10a to 10c are simplified block diagrams illustrating a perspective view of a mounting mechanism of the device for timed release of a bait according to an embodiment of the invention.
Figure 9B:
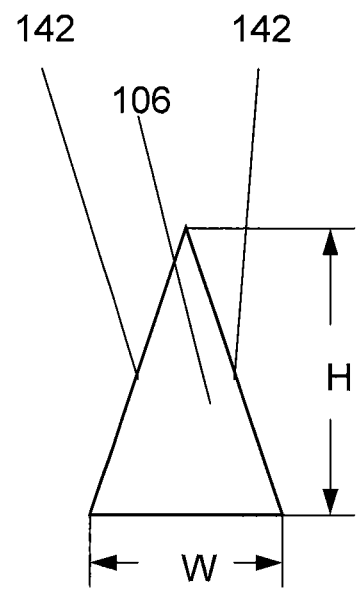
Figure 9C:
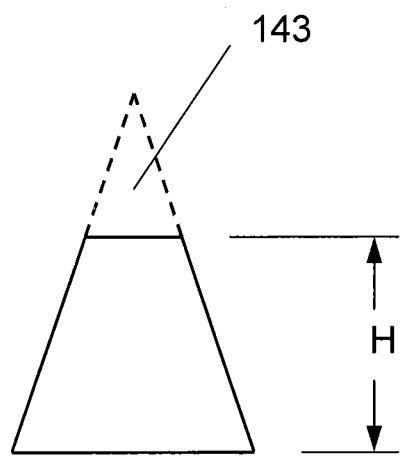

The water soluble timing element 106 can be used to provide a simple, passive and reliable timing mechanism. Referring to FIGS. 8 to 9b, the timing element 106 according to one embodiment of the invention is provided. The timing element 106 comprises an elongated body having a triangular—such as an isosceles triangular—cross section of a predetermined length L, width W and height H made of a water soluble material. Alternatively, the timing element 106 comprises bodies having, for example, different cross-sections such as, for example, a circular cross-section or a rectangular cross-section and different ratios of length L to Width W and to Height H. In one embodiment of the present invention, a fuse is provided that has a four-sided cross-section as illustrated in FIG. 9c, the fuse having parallel upper and lower surfaces, and angled sides, the fuse being otherwise identical to the fuse with the isosceles triangle configuration as described above, with a top portion 143 removed to provide a fuse with reduced Height H. In this manner, a fuse is provided with a shortened duration, as the fuse will dissolve more quickly when compared to the isosceles triangle configuration as described above. It is understood that a variety of fuses of different thicknesses or height could be provided, to provide various different fuse durations as needed. As illustrated in FIG. 8, in operation a predetermined portion 107 of the timing element body 106 is accommodated in a respective holding structure—aperture 110—disposed in the guiding element 108. A predetermined surface portion 140 of the timing element 106 is in contact with a respective portion of the surface 116 of the cover 104. The timing element 106 prevents relative movement between the guiding element 108 and the cover 104. The buoyancy of buoyancy element 114 causes predetermined force F to act on the predetermined surface portion 140 of the timing element 106, as indicated by the block arrows in FIG. 8. The timing element 106 being abutted in the aperture 110 experiences a reactive force acting on the surface 142 of the portion 107 disposed in the aperture 110. As a result, the timing element 106 is experiencing shearing stresses between the portions 106A, 106B and the portion 107, respectively. The size, shape and material of the timing element 106 are determined such that the timing element body withstands the predetermined force F acting thereupon for a predetermined time interval when immersed in water. When immersed in water the timing element body 106 dissolves gradually until the remaining portion is unable to withstand the predetermined force F.

As is evident, there are various possibilities for abutting the cover 104 using the timing element 106. For example, and end portion of the timing element 106 is accommodated in a respective cavity instead of the aperture 110 or the timing element 106 is accommodated in two apertures instead of being in contact with a surface.

For use with the device 100 it is desirable to provide timing elements 106 having same shape and size to fit in the aperture 110 and housing 128 while being able to withstand the predetermined force F for the duration of different time intervals. For example, for use with lobster traps it is desirable to provide time intervals in the range of 4 to 72 hrs with an accuracy of approximately +/−2 hr on the 4 hour duration timing elements and +/−6 hr on the 72 hrs timing elements. This is achieved in a number of ways or combination thereof, such as:

providing timing elements 106 made of different materials such as, for example, wood fibers, lye, milled grain, fish meal, fish oil, corn oil, canola oil, rock salt and bentonite;

providing timing elements 106 made of different mixtures of at least two water soluble materials;

providing timing elements 106 made of different mixtures of at least two materials with at least one water soluble material and one material that is non-soluble in water such as, for example, rock salt and fish meal;

providing timing elements 106 comprising a core made of a first water soluble material and at least a layer made of a second water soluble material surrounding the core; and, providing timing elements 106 made of a water soluble material compressed with different compression forces and/or size of the particulates.

Figure 10A:
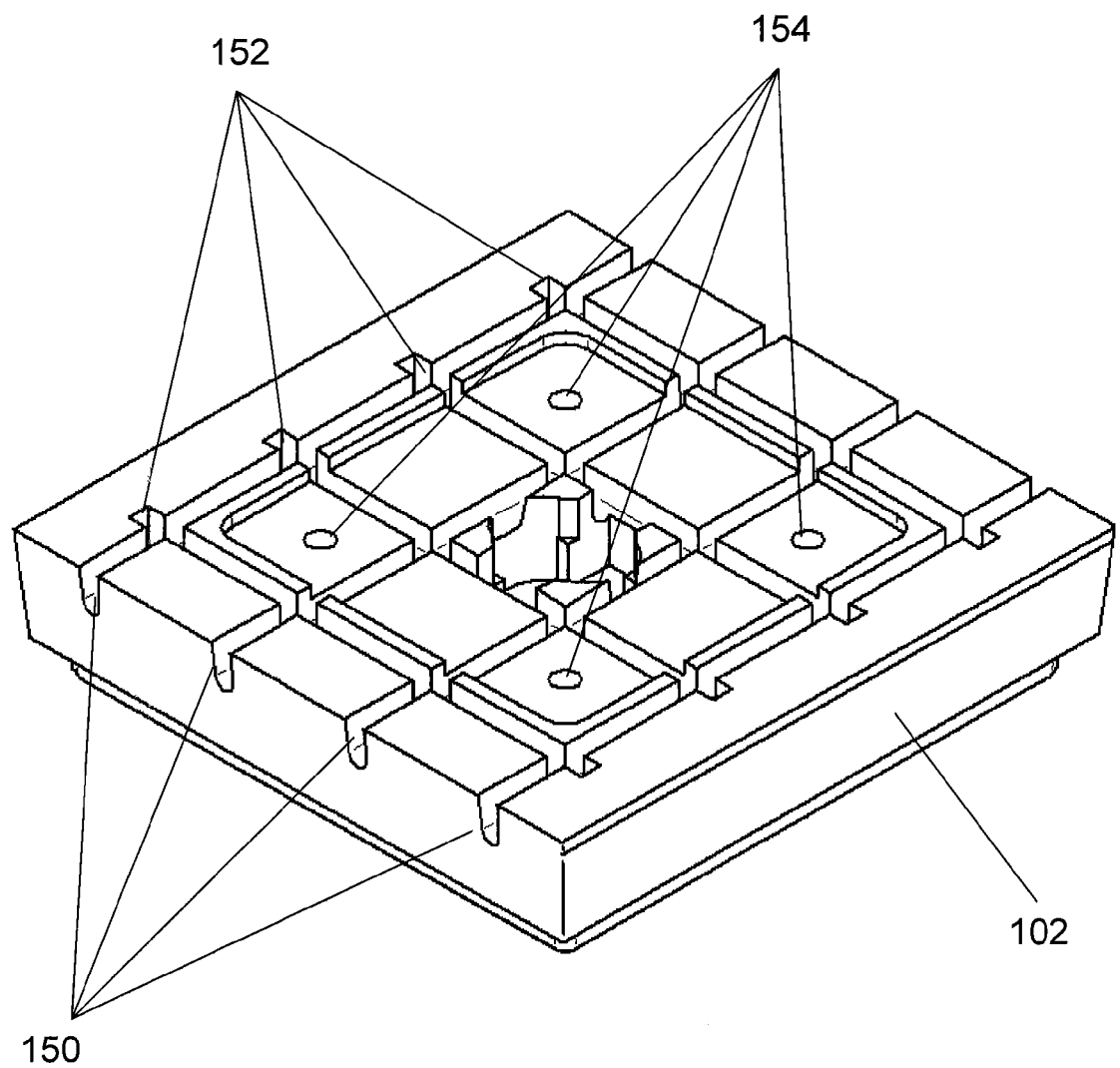
Figure 10B:
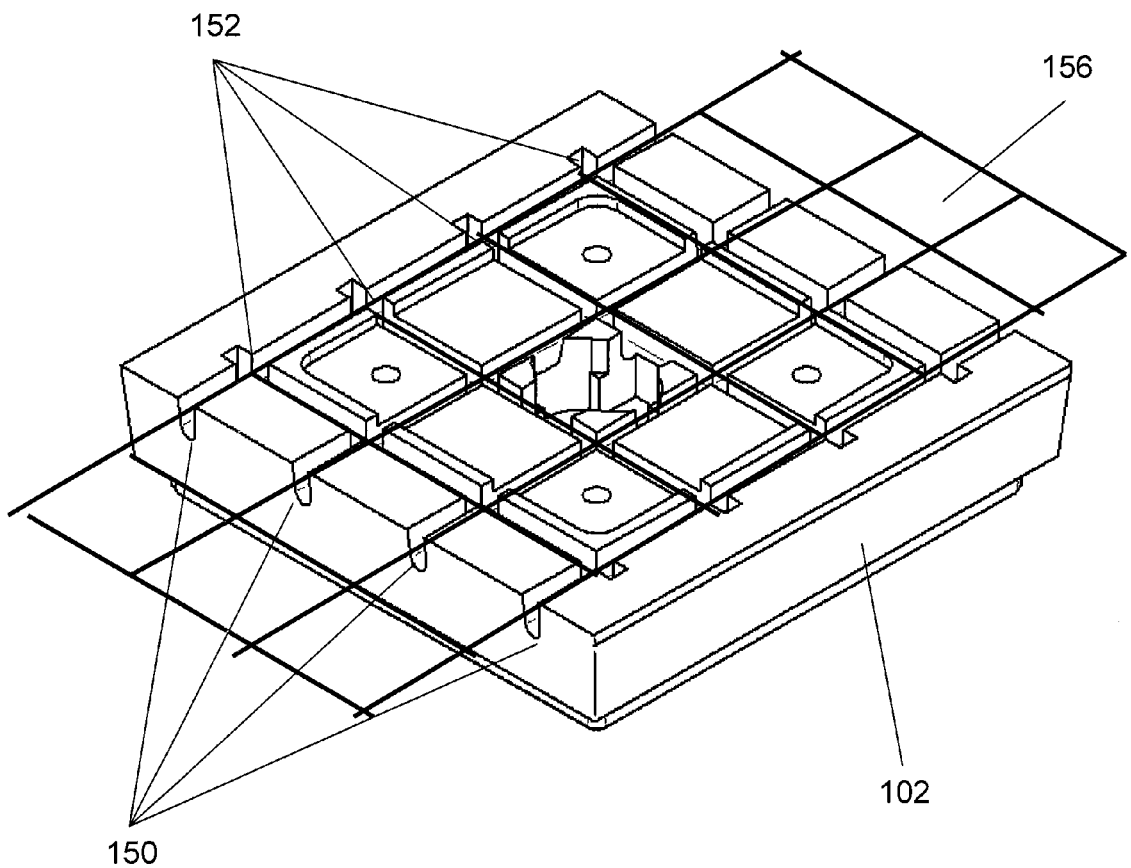
Figure 10C:
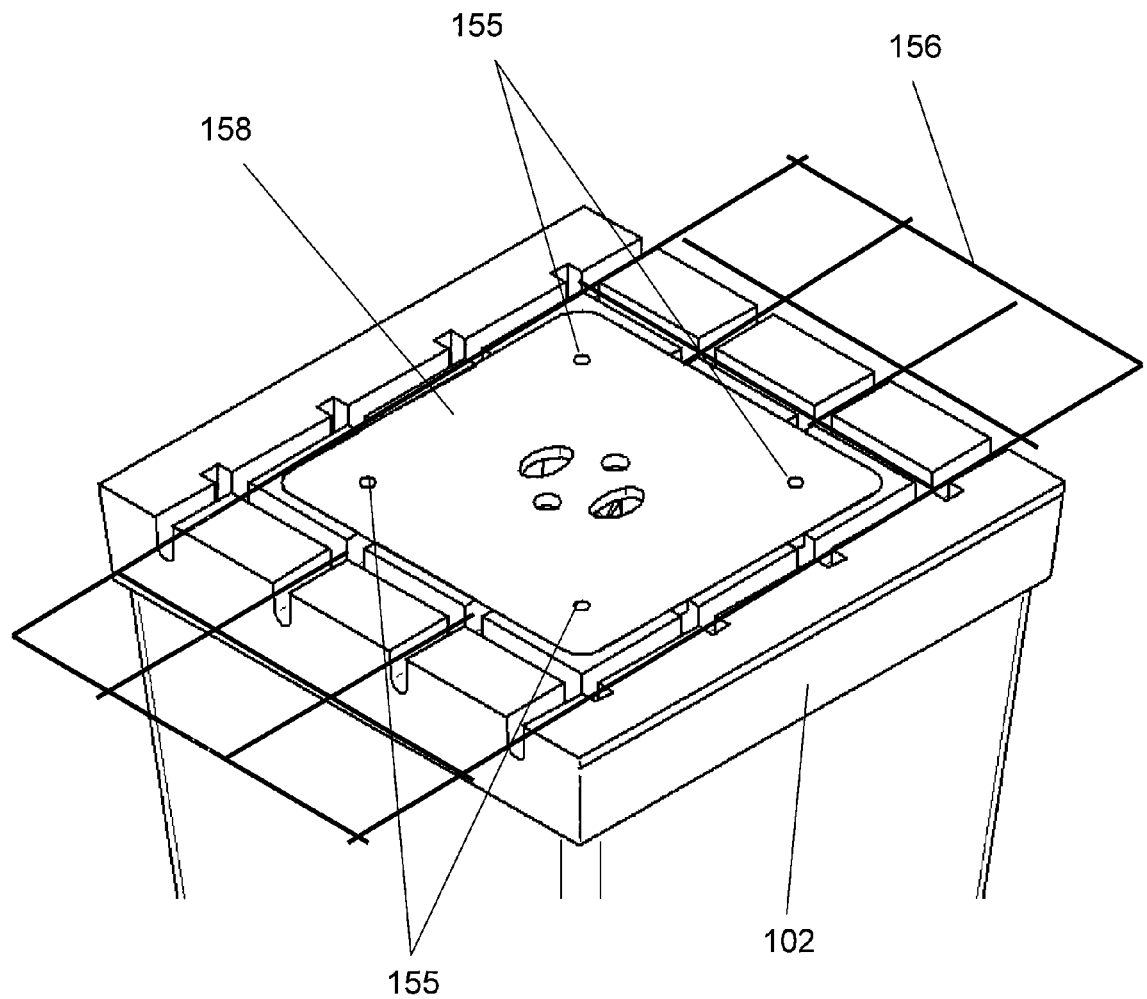

Referring to FIGS. 10a to 10c, an embodiment of a mounting mechanism for secure and releasable mounting the device 100 to a trap is provided. The mounting mechanism comprises channels 150 and 152 disposed in the bottom of the base 102, as illustrated in FIG. 10a. The number of the channels 150 and 152, the size of the channels 150 and 152, and the distance between the channels are determined for accommodating a portion of a mesh structure 156 such as, for example, a metal mesh, therein, as illustrated in FIG. 10b. The mesh structure 156 is then secured to the base by mounting plate 158 to the base using for example, screws 155 accommodated in respective threaded bores 154 disposed in the base 102, as illustrated in FIGS. 10a and 10c. The device 100 having the mesh structure 156 secured thereto is then disposed in the trap and the mesh structure 156 is tied to the trap.

The present invention has been described herein with regard to certain embodiments. However, it will be obvious to persons skilled in the art that a number of variations and modifications can be made without departing from the scope of the invention as described herein.

What is claimed is:

1. A device for timed release of a bait comprising:
a base;
a cover having solid top and side walls, the cover in concert with the base forming an enclosure, the cover being movable with respect to the base between a closed position for enclosing the bait therein and an open position for exposing the bait, a guiding channel structure protruding downwardly from a center portion of the top wall and having disposed therein a straight guiding channel;
an actuating mechanism for moving the cover from the closed position to the open position;
a guiding element mounted to the base, the guiding element interacting with the guiding channel for guiding movement of the cover in a straight direction between the closed and open positions, the guiding element having an abutting element for abutting the cover in the open position; and,
a timing element made of a water soluble material connected to the guiding element and the cover, the timing element for holding the cover in the closed position and for triggering the movement of the cover from the closed position to the open position after elapse of a predetermined time interval.

2. A device as defined in claim 1 wherein the actuating mechanism comprises a buoyancy element connected to the cover.

3. A device as defined in claim 1 wherein in operation the guiding channel and the guiding element are oriented substantially vertical in water.

4. A device as defined in claim 1 wherein a bottom end of the guiding element is mounted to the base inside the enclosure and wherein an upper portion of the guiding element protrudes from the cover.

5. A device as defined in claim 4 comprising a wall structure protruding upwardly from the center portion of the top wall such that the wall structure surrounds the timing element directly adjacent thereto, the wall structure having sufficient height for protecting the timing element.

6. A device as defined in claim 5 wherein the timing element is accommodated in a respective aperture disposed in the upper portion of the guiding element such that a bottom portion of the timing element abuts a top surface portion of the cover in the closed position and wherein the wall structure comprises an opening such that insertion of the timing element into the aperture is enabled therethrough.

7. A device as defined in claim 5 wherein the wall structure comprises holding elements for holding an elastic band for securing the timing element to the cover until the device is submerged in water.

8. A device as defined in claim 4 wherein the base comprises a securing element disposed therein for receiving/releasing the bottom end of the guiding element so as to mount the guiding element to the base.

9. A device as defined in claim 8 wherein the securing element comprises a spring clip.

10. A device as defined in claim 4 wherein the guiding element comprises at least one of stabilizer forks and bait barbs for securing the bait.

11. A method for timing release of a bait comprising:
providing the device for timed release of a bait of claim 1;
placing the bate inside the enclosure;
moving the cover to the closed position; and
placing the timing element made of a water soluble material which is connected to the guiding element and the cover in a predetermined location such that the timing element abuts the cover in the closed position.

\* \* \* \* \*